(12) United States Patent
Hietaranta et al.

(10) Patent No.: US 6,324,921 B1
(45) Date of Patent: Dec. 4, 2001

(54) INLET DIAPHRAGM CONSTRUCTION

(75) Inventors: Matti Hietaranta, Kangasala; Mika Eerola, Tampere, both of (FI)

(73) Assignee: Metso Field Systems Oy, Helsinki (FI)

( * ) Notice: Subject to any disclaimer, the term of this patent is extended or adjusted under 35 U.S.C. 154(b) by 0 days.

(21) Appl. No.: 09/397,823

(22) Filed: Sep. 17, 1999

(30) Foreign Application Priority Data

Sep. 17, 1998 (FI) .......................................... 982004

(51) Int. Cl.⁷ .......................................... G01L 3/00
(52) U.S. Cl. .......................................... 73/862.08
(58) Field of Search .............................. 73/54.28, 54.24, 73/54.23, 862.08, 866.5, 54.01, 54

(56) References Cited

U.S. PATENT DOCUMENTS

| | | |
|---|---|---|
| 4,062,226 | 12/1977 | Hietala . |
| 4,074,097 | 2/1978 | Hutchinson et al. . |
| 4,757,708 | 7/1988 | Hietaranta . |
| 5,157,962 * | 10/1992 | Fitzgerald et al. ............ 73/54.24 |
| 5,686,660 | 11/1997 | Lundberg . |
| 5,962,795 * | 10/1999 | Lambert ...................... 73/866.5 |

FOREIGN PATENT DOCUMENTS

3204817 A1   8/1983  (DE) .

\* cited by examiner

*Primary Examiner*—Benjamin R. Fuller
*Assistant Examiner*—Octavia Davis
(74) *Attorney, Agent, or Firm*—Alston & Bird LLP

(57) ABSTRACT

A diaphragm construction for a process measuring device comprises a sensing element arranged in a functional connection with a process medium to be measured, a part exterior of the process medium, comprising a measuring means, a lever-like transfer element to transmit a force effect exerted on the sensing element to the measuring means, and a diaphragm to isolate the process medium from the exterior part. The transfer element comprises a first rod part arranged to be placed in a process medium flow channel and a second rod part arranged to be placed in a part of the process measuring device exterior of the process. A fixing element is arranged to be placed in connection with the second rod part of the transfer element, the fixing element comprising a supporting portion and a fixing portion, wherein the diaphragm is arranged to be clamped between the fixing portion and the second rod part.

15 Claims, 2 Drawing Sheets

INLET DIAPHRAGM CONSTRUCTION

FIELD OF THE INVENTION

The present invention relates to an inlet diaphragm construction between process side and measuring mechanism in a process measuring device.

BACKGROUND OF THE INVENTION

To measure various processes, process measuring devices are known in which a measuring sensor is placed in a process medium flow channel or the like, and the actual measuring means is placed outside this flow channel. In such a process measuring device, a sensing element is fixed to a lever-like transfer element for transmitting the force and/or movement exerted by the process medium on the sensing element by the torque principle to the measuring means outside the flow channel system. The measuring means is a force transducer for measuring the force dependent on the torque applied to the transfer element constituting the lever arm, the force being proportional to a variable to be measured, such as consistency of the process medium. The process medium flow channel is provided with a measurement coupling comprising an opening through which the lever arm is introduced. The process measuring device can thus be divided into a portion on the process side and a portion outside the process. A diaphragm is placed in connection with the opening in the measurement coupling to prevent the process medium from entering into the portion of the process measuring device that is located outside the process. However, because the torque effect of the force applied to the sensing element must be transmitted by the lever arm to the portion of the process measuring device outside the process, this diaphragm must be made as elastic as possible, so as not to cause distortions in the measuring result on one hand and not to make the measuring device too insensitive on the other hand. Furthermore, it is not desirable that the measuring result be affected by other factors than the variable to be measured.

The diaphragm is subjected to very high demands, because if entered in the portion of the process measuring device that is outside the process, the process medium may cause serious damage to the process measuring device and may even break the process measuring device. Thus, the process measuring device must be either repaired or replaced by a new one, which will in any case cause extra costs and may even require a stoppage of the process until the damaged process measuring device has been repaired or replaced by a new one.

Finnish patent 75424, to which corresponds e.g. U.S. Pat. No. 4,757,708, presents one inlet diaphragm construction. The diaphragm is fixed to the frame of the process measuring device on one hand and between the first and second rod parts of the lever arm on the other hand. Thus, the diaphragm covers the opening of the measurement coupling. The first rod part is intended to be placed on the process medium side in the flow channel and, correspondingly, the second rod part is intended to be placed outside the process medium flow channel. A sensing element if fixed to the first rod part. The first and second rod parts are attached to each other preferably with a threaded joint, wherein either of the rod parts is arranged to penetrate the opening formed in the diaphragm to make the threaded joint between the rod parts and to clamp the diaphragm between the first and second rod parts. In some phases of the process, such as in starts, so-called clods or other accumulations may pass in the flow channel and hit the sensing element so strongly that the first rod part bends. For this reason, existing measuring devices are equipped with a so-called mechanical fuse which is produced by making the rod part thinner. In spite of this mechanical fuse, this impact-like force effect may cause a slight opening of the joint between the first rod part and the diaphragm, allowing process medium to enter inside the process measuring device, and serious damage may consequently be caused.

SUMMARY OF THE INVENTION

It is an aim of the present invention to eliminate the above-mentioned drawbacks to a great extent and to achieve an improved diaphragm construction to prevent process medium from penetrating through diaphragm when the first rod part is bent. The present invention is characterized in that the diaphragm is fixed to the second rod part with a fixing element which comprises preferably a sleeve-like support portion and a preferably flange-like fixing portion. The invention is based on the idea that in conjunction with the second rod part there is a fixing portion to press the diaphragm against the second rod part and to transfer the impact force on the first rod part to the second rod part in such a way that the pressing force between the second rod part and the inlet diaphragm is not substantially changed.

With the present invention, significant advantages are achieved when compared to solutions of prior art. The inlet diaphragm construction according to the invention makes the diaphragm remain tightly against the second rod part also in such situations in which the sensing element is subjected to impacting forces. Thus, a crack cannot be formed in the joint between the second rod part and the diaphragm. Because the joint between the first rod part and the fixing element is primarily on the side of the process flow in the inlet diaphragm construction according to the invention, a slight opening of this joint will not yet cause the process medium to enter inside the process measuring device. By using the inlet diaphragm construction according to the invention it is possible to significantly reduce the maintenance and repair costs.

BRIEF DESCRIPTION OF THE DRAWINGS

In the following, the invention will be described in more detail with reference to the appended drawings, in which.

DETAILED DESCRIPTION OF THE INVENTION

Figure 1:
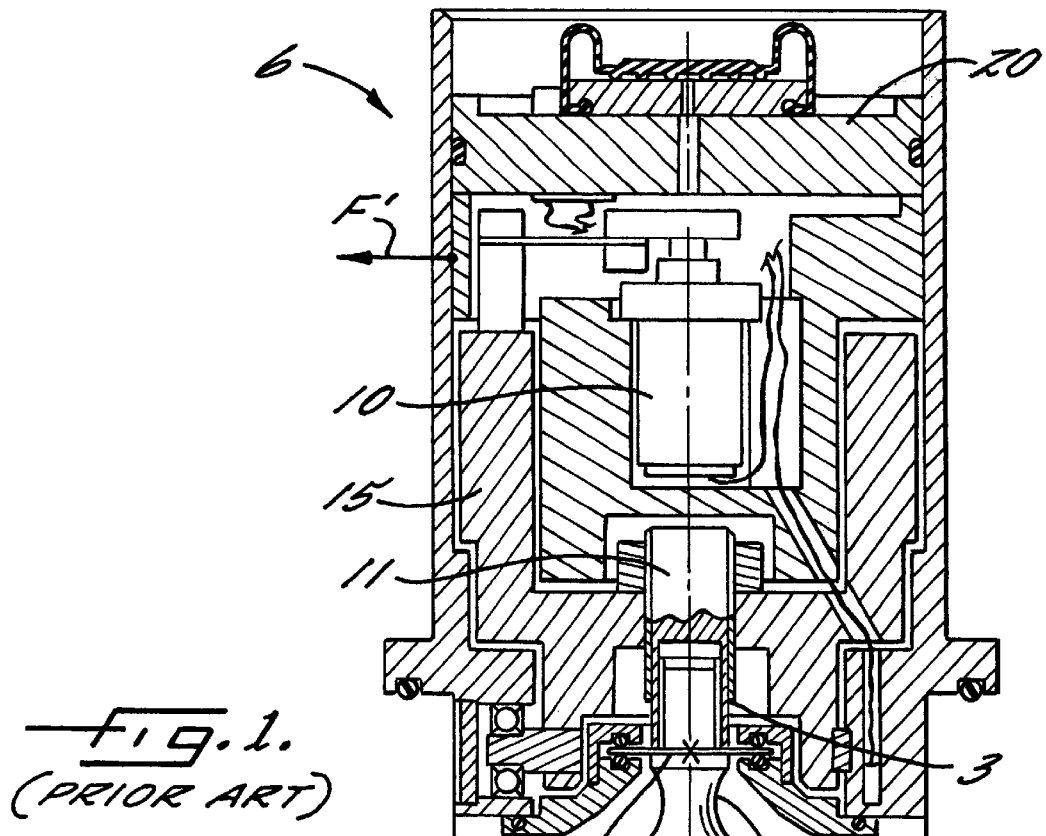
FIG. 1 shows an inlet diaphragm construction according to prior art.

FIG. 1 shows the lower part of a process measuring device 6 according to prior art, comprising a lever-like transfer element 11 constituting a lever arm for transmitting the force F exerted by the process medium on a sensing element (not shown) to a part outside the process medium by using torque principle. The rest of the measuring device, also comprising a means 10 for measuring the force F' transmitted by the torque, is isolated from the process medium by an inlet diaphragm 1 closing the inlet hole. The transfer element 11 comprises a first rod part 2 (taper pin) with a mechanical fuse 5 produced by narrowing. The first rod part 2 is inserted through the inlet diaphragm 1 and fixed to a second rod part 3 with a threaded joint, wherein the diaphragm 1 is clamped between the rod parts. The second rod part 3 is coupled to a damping cylinder 15 through which the force F' is actually transmitted to the measuring means 10.

Figure 2:
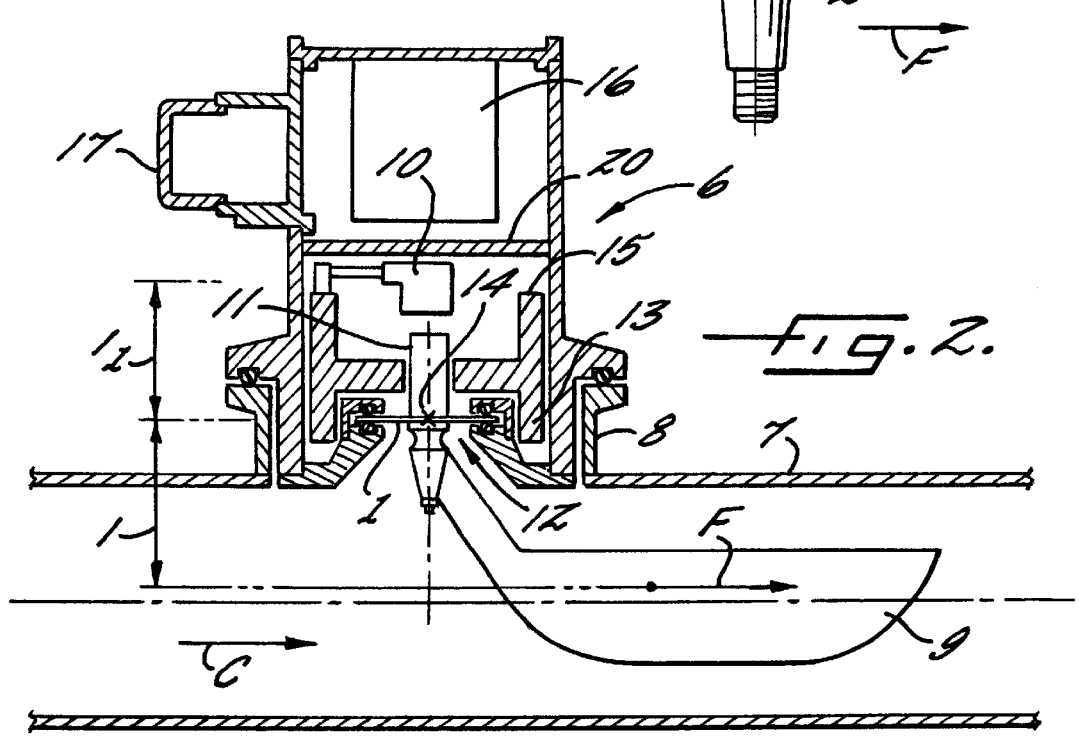
FIG. 2 shows a general view on the cross-section of the process measuring device placed in connection with the process medium flow channel.

FIG. 2 shows a cross-section of the process measuring device 6 placed in connection with a process medium flow channel 7. In the device, an inlet diaphragm construction of the invention is employed which will be described in more detail below with reference to FIG. 3. The process measuring device 6 is fixed to a measurement coupling 8 formed on the flow channel 7. The process measuring device 6 comprises a sensing element 9 which is placed in the flow channel when the process measuring device is installed in its position. Thus, the process medium flowing in the flow channel 7 (arrow C) causes in the sensing element 9 a force effect whose quantity is proportional to the consistency of the process medium containing solid particles in a liquid. The force effect exerted on the sensing element 9 is indicated with an arrow F in FIG. 2. The sensing element 9 is designed in such a way that the flowing process medium applies shear force thereto, e.g. to have a blade-like form, and the sensing element is prior art known as such. The process measuring device 6 comprises a measuring means 10 placed in the portion outside the effect of the process medium. This measuring means 10 is arranged to measure the power effect exerted on the sensing element 9 transmitted by a lever-like transfer element 11. The transfer element 11 is connected at its first end to the sensing element 9, and the second end is in functional connection with the measuring means 10. The transfer element 11 is introduced from the portion of the process measuring device 6 on the side the process medium to the portion outside the process medium via an inlet hole 12 and is fixed to a bearing bushing 13 which is, in turn, fixed pivotally to the measuring device 6 by a bearing. This bearing is not shown in detail in FIG. 2, but the bearing line is represented by the symbol X and is indicated with the reference numeral 14. In FIG. 1, the bearing is shown turned 90° from the actual position to the plane of the figure on the left hand side of the symbol X. This bearing 14 constitutes a pivot point of the transfer element 11, in relation to which the lever arms l, l1 can be determined. Thus, in a way known as such, it is possible to calculate the force effect F on the sensing element 9 when the lengths of the lever arms l, l1 are known and the force F' is measured at the other end of the transfer element 11.

The portion of the process measuring device outside the process further comprises a damping cylinder 15 which is surrounded by oil or a corresponding medium to attenuate, in a way known as such, vibrations and other effects disturbing the measurement. The damping cylinder 15 forms also functionally one end of the transfer element 11 which transmits the force to the measuring means 10. In the cross-section of FIG. 2 is still drawn, in an exemplifying manner, an electronic measuring unit 16, which is separated by an inner cover 20 from the part of the measuring device comprising the transfer element 11 and the measuring means 10, as well as a connecting box 17, through which the measured variable in electrical form, formed by the electronic measuring unit 16, can be transmitted for further processing. By means of the measuring means 10, the electronic measuring unit 16 generates a signal which is proportional to the force effect F exerted on the sensing element 9 in a way determined by the lever arms of the transfer element 11, as a result of which the consistency of the flowing process medium can be determined in a way known as such.

The force transducer of the measuring means 10 can be of any known type, e.g. a piezoresistive transducer, and the transducers will not be discussed in more detail in this context.

Figure 3:
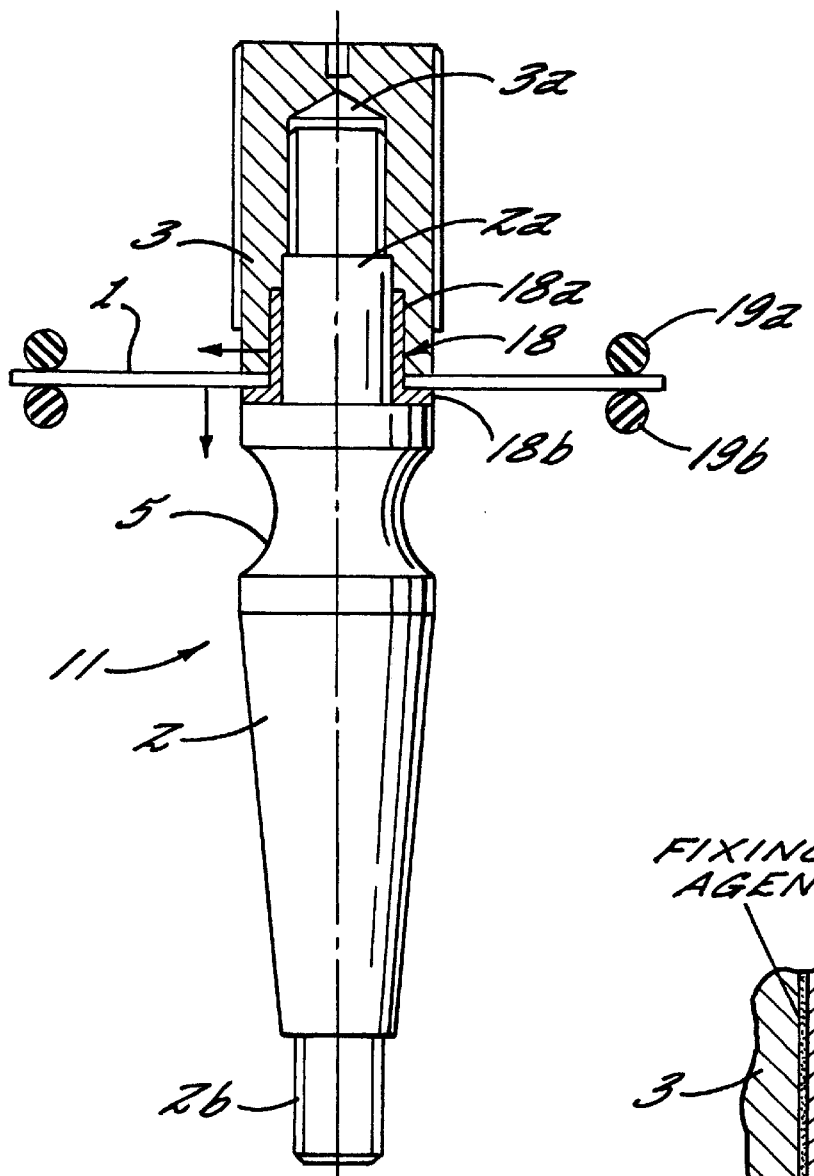
FIG. 3 shows an inlet diaphragm construction according to a preferred embodiment of the invention in a simplified cross-section.

The following is a more detailed description of the accomplishment of the structure according to a preferred embodiment of the invention with reference to the cross-section of FIG. 3. The cross-section of FIG. 3 shows primarily only the features which are necessary for understanding the invention. FIG. 3 shows the structure of the lever-like transfer element 11 on both sides of the diaphragm 1 as well as the attachment of the diaphragm to this transfer element 11. The transfer element 11 comprises the above-described first rod part 2 which has preferably a conical shape to fix the sensing element 9 by means of a fixing sleeve having a corresponding inner conical shape and by means of a nut to be screwed at the tip 2b of the rod part, the fixing being visible in FIG. 2. In this context, the first rod part is called a taper pin 2. Furthermore, the transfer element 11 comprises preferably a mechanical fuse 5 which is produced by providing the taper pin 2 with a narrowing or necking which is between the diaphragm 1 and the portion tapering conically towards the process medium. The purpose of this mechanical fuse is that a strong impact on the sensing element 9 does not open the joint between the diaphragm 1 and the taper pin 2 but will only bend the taper pin 2. This taper pin 2 and mechanical fuse 5 are in the process side part of the process measuring device 6. In the part exterior of the process medium is placed the second rod part 3 which will in this specification be called a counter pin 3. The taper pin 2 and the counter pin 3 are fixed to each other preferably with a threaded joint, and a fixing agent is also used in the joint to secure the tightness and sealing. The fixing agent used can be a substance which binds the elements to each other, and such a fixing agent is usually a fluid which creates a bond between the elements when hardened. Examples are known liquids which harden in an airless space, wherein a metal can act as a catalyst in the hardening.

Figure 3A:
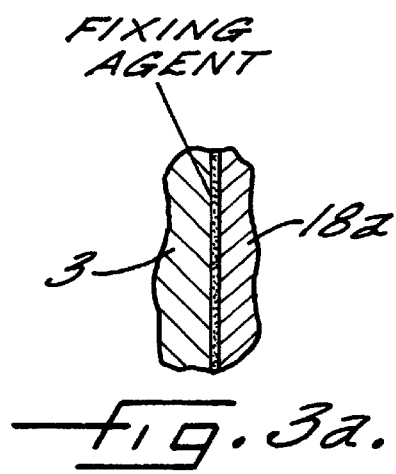
FIG. 3a illustrates one attachment of the fixing element to the transfer element.
Figure 3B:
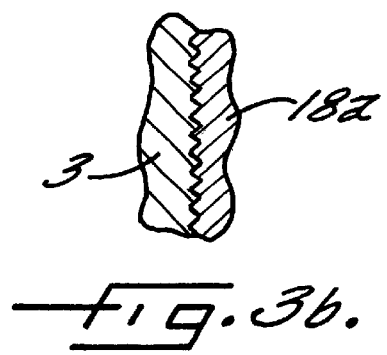
FIG. 3b illustrates another attachment of the fixing element to the transfer element.

According to the invention, the diaphragm is kept tight by means of a special fixing element 18. This fixing element 18 comprises a preferably sleeve-like supporting portion 18a and a preferably flange-like fixing portion 18b. The inlet diaphragm 1 is arranged to be attached to the transfer element 11 in such a way that the supporting portion 18a is placed in an opening formed in the centre of the inlet diaphragm 1, after which the diaphragm is clamped between the counter pin 3 and the flange-like fixing portion 18b of the fixing element, when the supporting portion 18a is attached with a fixing agent into a hole of the counter pin. The fixing agent used can be an agent binding the elements to each other as mentioned above, and it is illustrated in an enlarged view of FIG. 3a. It is also possible to use a threaded joint between the supporting portion 18a and the counter pin 3, as shown in an enlarged view of FIG. 3b, and it necessary, this threaded joint can be secured with the fixing agent. When the supporting portion 18a is firmly attached to the counter pin, the flange-like fixing portion 18b of the fixing element is tightly pressed against the diaphragm 1 which, in turn, is tightly pressed against the counter pin 3.

In the assembly, the fixing agent is applied on the different parts so that it will be present between the supporting portion 18a and the counter pin 3. The fixing agent is also applied in the space between the taper pin 2 and the supporting portion 18a as well as in the space between the taper pin 2 and the counter pin 3. As soon as the fixing agent is applied in the corresponding parts, the assembly is made, and immediately before the fixing agent is hardened, the taper pin 2 is joined to the counter pin 3. At this moment the flange-like fixing portion 18b and the diaphragm 1 are pressed between the counter pin 3 and the taper pin 2. The taper pin 2 and the counter pin 3 are attached to each other by screwing together and tightening using sufficient torque. In the finished structure, the sleeve-like fixing portion 18a is placed around a pin-like fixing portion 2a which protrudes from the taper pin 2 and is screwed by a threaded joint in the opening 3a in the counter pin 3.

The diaphragm 1 is fixed, in a way known as such, in the area of its outer periphery by means of sealing rings 19a, 19b, preferably O rings, to the process measuring device, as is also illustrated in the crosssection of FIG. 2. As to the constructional possibilities of the of the process measuring device 6 and ways of fixing the diaphragm 1 to the peripheral region of the inlet hole and to the transfer element, reference is made to the U.S. Pat. No. 4,757,708, the entire disclosure of which is incorporated herein by reference.

The inlet diaphragm construction of the invention functions in problematic impact situations in such a way that the taper pin 2 will bend, wherein the joint between the taper pin 2 and the fixing portion 18b of the fixing element may be opened slightly on the side of the impact direction. However, this will not result in access of the process medium to the other side of the diaphragm, because in spite of this impact force the joint between the fixing portion 18b and the diaphragm 1 can not be opened, because there is no locking joint at the seam between the flange-like fixing portion 18b of the fixing element and the taper pin 2. Thus, a movement of the abutting surface of the taper pin 2 away from the diaphragm 1 and correspondingly from the flange-like fixing portion 18b of the fixing element 18, caused by bending of the taper pin 2, will not induce a force effect which could result in a displacement of the flange-like fixing portion 18b away from the diaphragm 1. Another factor to prevent the development of a leak is the effect of the sleevelike supporting portion 18a of the fixing element. The supporting element 18a and the fixing portion 18b are formed in such a way that they can not substantially move in relation to each other. Thus, when the taper pin 2 bends, the pressing force effected by the taper pin 2 on the side opposite to the impact tends to lift off the fixing portion 18b on the side of the impact, but the supporting portion 18a prevents this, because the walls of the supporting portion 18a are urged against the wall of the second rod part 3. To achieve said supporting effect, the height of the supporting portion 18a in the direction of the longitudinal axis of the transfer element 11 must be greater than the thickness of the diaphragm 1.

The inlet diaphragm construction according to the invention does not cause major changes in the process at the manufacturing stage. In the manufacture, it is possible to utilize structures of prior art; for example, a taper pin according to prior art can be used as the taper pin 2. In a corresponding manner, the counter pin 3 can be made of a counter pin of prior art either by providing it with a threading or by expanding the cylindrical inner hole 3a in such a way that the supporting portion 18a of the fixing element will be tightly accommodated in the space left by this expansion between the pin-like fixing portion 2a of the taper pin 2 and the counter pin 3. The fixing element 18 is manufactured in one piece, e.g. by machining or molding in a mold, of a metal or another material with mechanical resistance and resistance to process agents. The length of the supporting portion 18a of the fixing element in the direction of the transfer arm 11 must be sufficient to secure its function to prevent the bending of the flange portion.

The structure of the fixing element 18 is simple as far as the manufacture and assembly is concerned. The sleeve-like supporting portion 18a, designed to fit around one of the transfer element parts in a substantially coaxial relationship thereto, and the flange-like fixing portion 18b extending exteriorly of and around the sleeve at one end thereof, designed to abut with its face transverse to the axial direction of the sleeve against the face of the diaphragm 1, do not entail complicated manufacturing processes or difficulties in assembly.

It is essential in the inlet diaphragm construction of the invention that the joint (seam) between the fixing portion 18b of the fixing element 18 and the taper pin 2 is on the side of the process medium. On the other hand, the taper pin 2 can be provided with a cylindrical hole instead of a pin-like fixing portion 2a and, correspondingly, the counter pin 3 can be provided with a pin-like protrusion arranged to be inserted in this hole, wherein the arrangement can be analogous to the arrangement of FIG. 3. In this alternative, it must be taken into account in the dimensioning that when the taper pin 2 is bent, the pin-like protrusion of the counter pin 3 must not bend. The supporting portion 18a of the fixing element extends in the hole formed in the taper pin 2 and is firmly attached at least to the pin-like protrusion by means of a fixing agent and/or a thread joint, but the diaphragm 1 is still fixed between the fixing portion 18b and the counter pin 3, not between the fixing portion 18b and the taper pin 2. Fixing agent can also be applied between the taper pin 2 and the counter pin 3 and between the taper pin 2 and the supporting portion 18a in a manner analogous to the embodiment of FIG. 3.

The present invention is not limited solely to the embodiments presented above, but it can be modified within the scope of the appended claims. In a practical use of the invention, the process medium can be in principle any flowing substance which is capable of producing a force effect on the sensing element 9. The invention is used particularly in devices for measuring the consistency of a process medium, such as in devices for measuring the consistency of fibrous pulp flowing in a process pipe in pulp and paper industry.

We claim:

1. An inlet diaphragm construction for a process measuring device operable for measuring a process medium flowing in a process medium flow channel, which comprises:

a sensing element arranged in a functional connection with the process medium flowing in the process medium flow channel, a part exterior of the process medium flow channel, comprising a measuring means for measuring a force effect exerted on the sensing element, a lever-like transfer element having a longitudinal axis to transmit the force effect exerted on the sensing element to the measuring means, and a diaphragm having a thickness to isolate the process medium from the exterior part, wherein the lever-like transfer element comprises a first rod part arranged to be placed in a process medium flow channel and a second rod part arranged to be placed in the part of the process measuring device exterior of the process, and further comprising a fixing element formed separately from and connected with the second rod part of the transfer element and comprising a supporting portion and a fixing portion, the diaphragm being clamped between the fixing portion and the second rod part such that the fixing element sealingly attaches the diaphragm to the second rod part independently of position of the first rod part with respect to the fixing portion of the fixing element.

2. An inlet diaphragm construction according to claim 1, wherein the supporting portion has a height in a direction of a longitudinal axis of the transfer element that is greater than the thickness of the diaphragm.

3. An inlet diaphragm construction according to claim 1, wherein the supporting portion is fixed to the second rod part.

4. An inlet diaphragm construction according to claim 2, wherein the supporting portion is fixed to the second rod part.

5. An inlet diaphragm construction according to claim 3, wherein the supporting portion is sleeve-like.

6. An inlet diaphragm construction according to claim 4, wherein the supporting portion is sleeve-like.

7. An inlet diaphragm construction according to claim 3, wherein the supporting portion and the second rod part are attached by a threaded joint therebetween.

8. An inlet diaphragm construction according to claim 4, wherein the supporting portion and the second rod part are attached by a threaded joint therebetween.

9. An inlet diaphragm construction according to claim 5, wherein the supporting portion and the second rod part are attached by a threaded joint therebetween.

10. An inlet diaphragm construction according to claim 6, wherein the supporting portion and the second rod part are attached by a threaded joint therebetween.

11. An inlet diaphragm construction according to claim 3, wherein a fixing agent is used in attaching the supporting portion to the second rod part.

12. An inlet diaphragm construction according to claim 4, wherein a fixing agent is used in attaching the supporting portion to the second rod part.

13. An inlet diaphragm construction according to claim 5, wherein a fixing agent is used in attaching the supporting portion to the second rod part.

14. An inlet diaphragm construction according to claim 6, wherein a fixing agent is used in attaching the supporting portion to the second rod part.

15. A diaphragm construction in a process measuring device for isolating a measuring means of the process measuring device outside a process flow channel from contact by process medium in the flow channel, the diaphragm construction comprising:

a sensing element for placement in the process flow channel such that the process medium flowing along the process flow channel exerts a force on the sensing element;

a rod-shaped transfer element connected at one end thereof to the sensing element and extending therefrom along a longitudinal axis to an opposite end arranged outside the process flow channel for transmitting an effect of the force on the sensing element to the measuring means of the process measuring device, the transfer element comprising a first rod part connected to the sensing element and a second rod part connected to the first rod part;

a diaphragm for isolating the measuring means from the process medium, the diaphragm being penetrated by the transfer element at an aperture formed through the diaphragm such that the first rod part is on a side of the diaphragm facing the process medium and the second rod part is on an opposite side of the diaphragm; and a fixing element for sealing a joint between the diaphragm and the transfer element, the fixing element including a tubular supporting portion and a flange-shaped fixing portion extending radially outward from the tubular supporting portion, an end portion of one of the first and second rod parts extending through the tubular supporting portion into a recess defined in an end portion of the other of the first and second rod parts and being fixed therein, the tubular supporting portion being rigidly and sealingly affixed to the second rod part, and an edge of the diaphragm that surrounds the aperture being clamped between the fixing portion and an end face of the second rod part.

* * * * *